Nov. 16, 1965 W. C. FREHSE 3,217,921
SEALING DEVICE
Filed Feb. 21, 1962 2 Sheets-Sheet 1

INVENTOR
Walter C. Frehse
BY Kenyon, Palmer, Steward & Estabrook
ATTORNEYS

INVENTOR
Walter C. Frehse

_United States Patent Office_

3,217,921
Patented Nov. 16, 1965

3,217,921
SEALING DEVICE
Walter C. Frehse, Wabash, Ind., assignor to The General
Tire & Rubber Company, a corporation of Ohio
Filed Feb. 21, 1962, Ser. No. 174,883
4 Claims. (Cl. 220—46)

This invention relates to sealing devices, and more particularly, it concerns a gasket adapted to provide a highly effective and improved fluid seal between a receptacle and closure therefor, such as, for example, the cabinet and door respectively on a front-loading dishwasher.

Front-loading appliances such as clothes washers and dishwashers have become increasingly popular in recent years principally because appliances of this type may be incorporated as modular units in kitchen counters, they may be stacked or arranged one over the other to save space and for other reasons. Anyone who has seen such a front-loading clothes washing machine or dishwasher in operation will appreciate the importance of an effective fluid seal between the door and the appliance cabinet to prevent water from within the cabinet from leaking out about the edges of the door. In early models, the problem of providing an effective seal between the door located on the side or front of such an appliance was overcome by the use of a circular door, thereby enabling a gently curved, unpuckered or undistorted, continuous gasket to be inserted about the door opening to provide the necessary fluid seal. More recently, and particularly, in front-opening dishwashers, square or rectangular doors have been found to be desirable from the standpoint of providing a large access to the dishwasher cabinet interior. The sharp turns or short radius curves at the corners of such rectangular openings, however, complicate the sealing problem because of the difficulty in achieving an undistorted seal through the corners of the opening. In the past, various solutions to this problem have been advanced, such as by gently rounding the corners of the square or rectangular opening with relatively large radius curves or by using a fabricated or non-continuous seal; the former mitigating to some extent the desirability of the rectangular door while the latter gives rise to substantial expenses in achieving the necessary fluid seal. Furthermore, the problems of achieving the necessary seal are additionally complicated by the existence of higher fluid pressures within the cabinet, particularly in dishwashers, due to the high temperatures, spraying pressures and the like to which the water within the cabinet is subjected.

Accordingly, a principal object of the present invention is to provide a highly effective sealing device or gasket for use about a receptacle closure, and particularly, between the door and cabinet of a front-loading dishwasher by which the aforementioned problems are substantially and effectively overcome.

Another object of this invention is the provision of a flexible gasket or sealing device by which a highly effective fluid pressure seal may be achieved in a receptacle closure assembly for an opening having corners defined by small radius curves.

A further object of this invention is that of providing a gasket of the type referred to which may be used to provide a distortion free, continuous seal throughout small radius curves at the corners between a rectangular door and the cabinet of front-loading dishwasher.

Another object of this invention is the provision of a gasket of the type referred to which takes the form of an elongated strip of rubber-like material capable of being flexed without distortion to accommodate the small radius curves at the corners of a rectangular, front-loading dishwasher door assembly and further, which serves as an alignment agent for the door in the assembly.

A still further object of this invention is that of providing a gasket of the type aforementioned which may be economically formed by extruding such rubber-like material as vinyl chloride polymers.

Other objects in further scope of applicability of the present invention will become apparent from the detailed description given hereinafter. It should be understood, however, that the detailed description, while indicating a preferred embodiment of the invention, is given by way of illustration only, since it will become apparent to those skilled in the art from this description that various changes and modifications can be made without departing from the true spirit in scope of this invention.

In general, the aforementioned objects are accomplished by a gasket in the form of an elongated strip of rubber-like material having a substantially planar base adapted to seat in fluid tight relation within the cabinet or receptacle opening throughout the inside of small radius curves at the corners thereof, and a generally wedge shaped sealing portion converging toward the forward edge of the base. The sealing portion is provided with a plurality of longitudinal ribs of saw-tooth cross-sectional configuration, which ribs are engageable by a surface on the door to be deflected slightly inwardly thereby enabling relatively high pressures internally of the cabinet in which the seal is to be used to urge the ribs into tighter sealing engagement with the door surface. The wedge shaped sealing portion has a bulbous bumper rib at its rearward edge which, in turn, forms with the rearward portion of the strip body, a channel for receiving a generally L-shaped mounting device. Further, the dimensions of the gasket and particularly the sealing ribs thereon are correlated with the small radius curves at the corners of the cabinet opening so as to be distortion free throughout these curves.

A more complete understanding of the sealing device of the present invention and its method of use may be by reference to the accompanying drawings in which.

Figure 1:
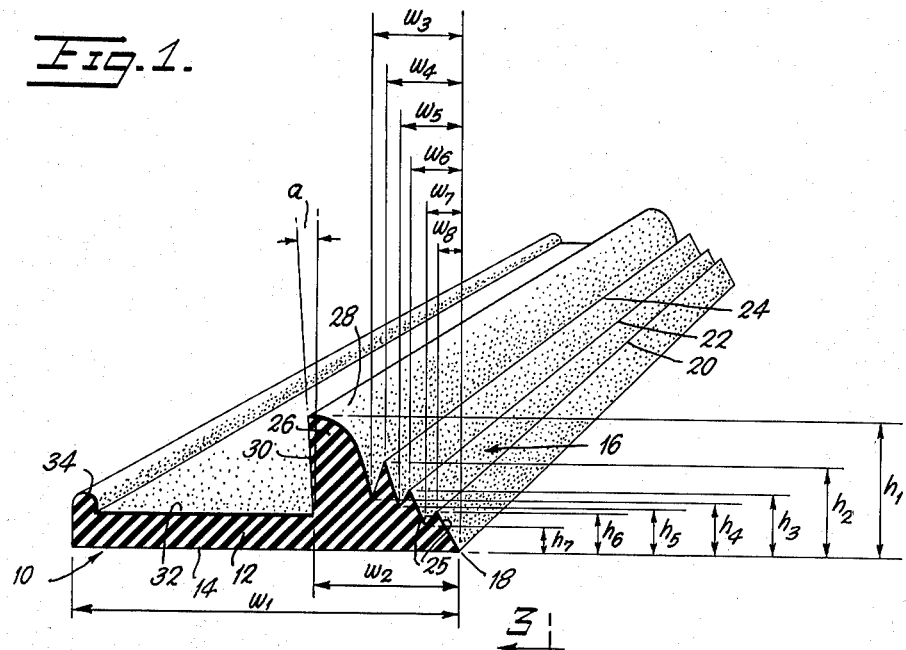
FIG. 1 is a perspective view illustrating the short length of a preferred form of the gasket of this invention.

Referring now to the drawings and particularly FIG. 1 thereof, the gasket of this invention is shown to be in the form of an elongated strip of extruded rubber-like material and designated generally by the reference numeral 10. While any suitably flexible rubber-like material may be employed, it is preferred that the sealing strip 10 be formed from such vinyl chloride polymers as copolymers with vinyl acetate, vinylidene chloride polymers, vinyl ester polymers and the like. In cross-section, the sealing strip 10 includes a body portion 12 having a substantially planar base 14 and a generally wedge shaped sealing portion 16 projecting from the body portion and converging toward the forward edge 18 of the base. In the embodiment illustrated, the upper or contacting surface (as shown in FIG. 1) of the sealing portion is provided with a plurality of longitudinal sealing ribs 20, 22 and 24 to define generally, a saw-tooth cross sectional configuration. Thus, it will be noted that each of the ribs 20, 22 and 24 are defined by a pair of oppositely inclined, intersecting planar surfaces 25 diverging toward or in the direction of the base 14.

Toward the rear of the sealing portion 16 is a relatively large, bulbous, bumper rib 26 having a rearwardly inclined arcuate front surface 28 and a planar rear surface 30 inclined rearwardly to make a small angle $a$ with the vertical or with a plane normal to the base 14. It is preferred that the angle $a$ is approximately 3° though it is contemplated that slight deviations from this specific angle may be used. The body portion 12, rearwardly of the surface 30, is formed having a substantially planar surface 32 generally parallel to the base 14 which terminates rearwardly in an upstanding rib 34.

Figure 2:
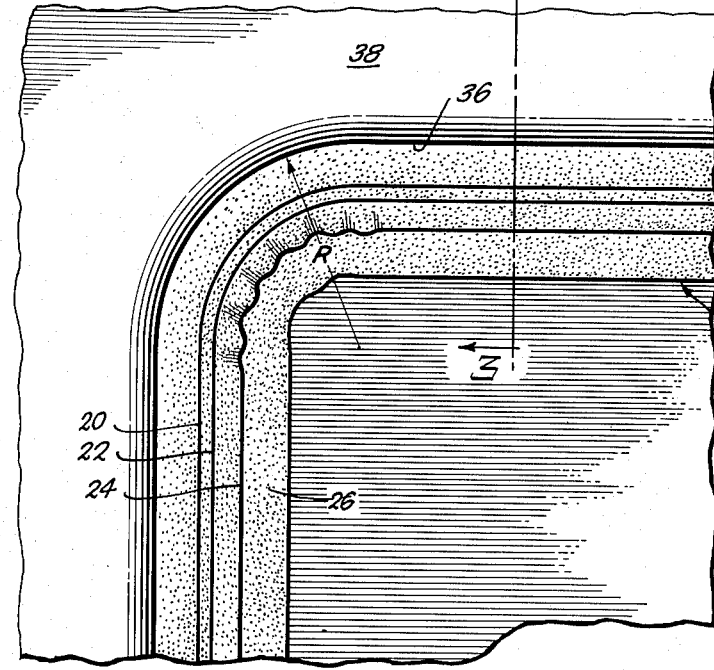
FIG. 2 is a fragmentary front elevation illustrating the gasket assembled in a rectangular opening of a front-loading dishwasher at one upper corner thereof.
Figure 3:
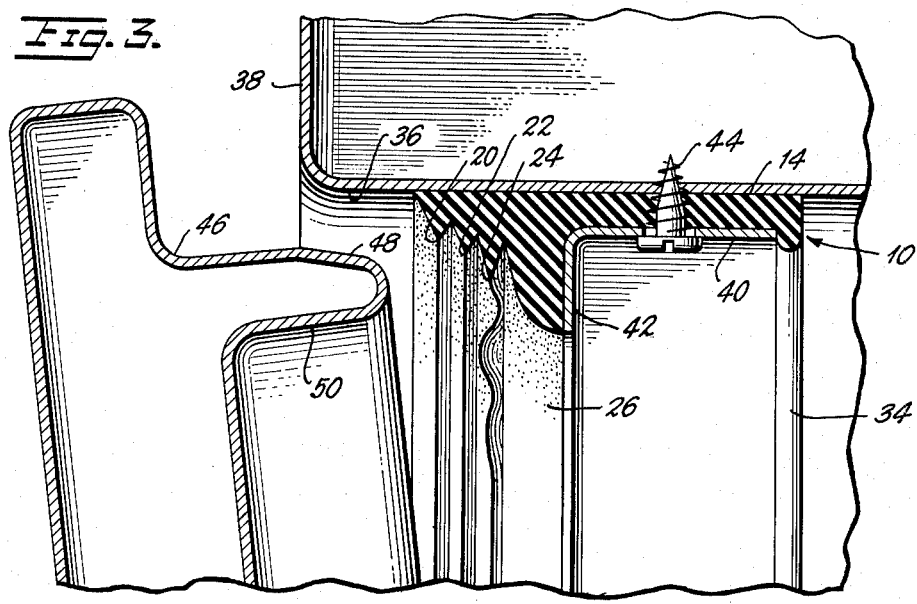
FIG. 3 is a fragmentary cross-sectional view taken along line 3—3 of FIG. 2 with the addition of a door portion slightly before closing.
Figure 4:
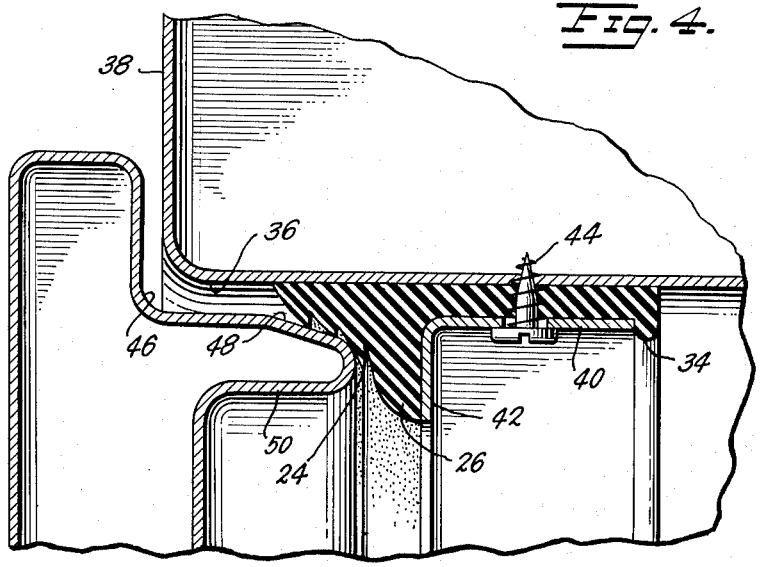
FIG. 4 is a cross section similar to that shown in FIG. 3 but wherein the door member is closed.

The manner in which the gasket of the present invention in the form of the sealing strip 10 is fitted to a closure assembly and particularly within the door assembly of a front opening dishwasher will be understood by reference to FIGS. 2, 3 and 4 of the drawing. As shown, the gasket is mounted such that the base 14 thereof seats in fluid tight relation with the peripheral edge 36 of the opening in the dishwasher cabinet shell 38, the peripheral edge of the opening having curves at the corners thereof of a small radius R. To retain the gasket firmly against the peripheral edge surface 36, a metallic mounting strip of L-shaped cross-section having walls 40 and 42 is received in a channel defined by the rib 34, surface 32 and surface 30 in the strip 10. Suitable means such as self-tapping screws 44 are employed to draw the metallic mounting strip inwardly against the surface 36. When so mounted, the gasket provides an excellent seal between the dishwasher casing and a door 46 preferably of the type having a seal-engaging surface 48 on an inwardly projecting ridge or bead 50.

One of the principal features to which effectiveness of the gasket may be attributed is the manner in which it may be flexed to seat within the curved corners of a small radius R without distortion and consequent loss of sealing properties of the critical parts of the sealing portion 16. Hence, as may be seen in FIGS. 2 and 3, the ribs 20 and 22 retain substantially their initial shape without distortion throughout the small radius curves. While this characteristic may be achieved with various shapes and sizes of gaskets formed from various types of material, it has been found that where the radius R is approximately ¾ of an inch and where a gasket of the cross-sectional shape of the strip 10 in FIG. 1 was formed from an extruded vinyl chloride polymer, particularly good results were obtained with the dimensions tabulated below under columns A and B, which respectively, relate to the dimension reference letters shown in FIG. 1 and the corresponding dimension in inches.

| A | B | A | B |
|---|---|---|---|
| $w_1$ | 1.520 | $h_1$ | .520 |
| $w_2$ | .575 | $h_2$ | .340 |
| $w_3$ | .342 | $h_3$ | .243 |
| $w_4$ | .300 | $h_4$ | .197 |
| $w_5$ | .256 | $h_5$ | .177 |
| $w_6$ | .206 | $h_6$ | .173 |
| $w_7$ | .150 | $h_7$ | .110 |
| $w_8$ | .100 | | |

It will be noted from the above table of dimensions that the distance of maximum projection of the rib 22 from the base 14 ($h_3$) is .243″ or, slightly less than ⅓ the radius of curvature R where R is equal to ¾″. The rib 24, however, exceeds this amount of projection from the base 14 and as illustrated in FIGS. 2 and 3, is distorted into a substantially serpentine shape. Also, the bumper rib 26 will be distorted; however, because of the generally rearwardly inclined shape of the rib 26 a substantial amount of the distortion therein is restricted by the wall 42 in the metallic mounting strip. Also, the serpentine shape taken by the rib 24 will have little or no affect on the sealing properties of the gasket as will be understood from the description which follows below.

In use, after the sealing strip has been mounted as above mentioned, when the door 46 is moved to a close position as shown in FIG. 4, the surface 48 on the bead 50 engages the undistorted ribs 20 and 22 deflecting them slightly inward. Also, the rib 24, which as aforementioned, is distorted somewhat due to the radius of curvature R in the corners of the door opening, is engaged by the nose portion of the bead 50 to make sealing contact therewith and to be displaced out of its distorted configuration by positioning between the bead 50 and the front face 28 of the bumper rib 26. The rib 24 will, of course, be undistorted along the straight portions of the opening and operate in substantially the same manner as the ribs 20 and 22 along these straight portions. It will be noted, therefore, that any elevated pressures existing within the cabinet will operate to urge the sealing ribs 20, 22 and 24 into tighter sealing engagement with the respective portions of the door 46. Further, because of the generally wedge shaped configuration of the sealing portion 16, the door is constrained to a central position within the cabinet opening. Also, the provision of the bumper rib 26 backed up by the wall 42 in the L-shaped mounting member assures a positive but resilient limiting means for inward movement of the door.

Thus, it will be seen that by the gasket of this invention a highly effective seal may be provided in a receptacle such as a dishwasher cabinet throughout the corners of a generally rectangular door opening therein, which corners are provided with an extremely small radius of curvature. This result obtains principally because of the distortion free nature of at least two of the sealing ribs 20 and 22 completely throughout the small radius curvature. Moreover, while the third rib 24 undergoes some distortion in the curves, it nevertheless is available along the straight portions of the closure assembly and further, as described above, is deflected even in the corner to provide an additional sealing surface.

It will be readily apparent to those skilled in the art that various modifications of the invention are possible such as for example, providing only one sealing rib in place of the ribs 20 and 22. Also, while the gasket is particularly suitable for use in front-loading dishwashers, it will be apparent to those skilled in the art that it will find application in other types of closure assemblies. For this reason, it is to be distinctly understood that the above-given description is illustrative only and that the true spirit and scope of the invention is to be determined by the appended claims.

I claim:

1. In combination a closure member and a polygonal receptacle having an opening with small radius curves between the straight portions thereof, a gasket mounted in said opening and conforming to said curves providing a fluid seal between said closure member and said opening, said gasket comprising: an elongated solid strip of rubber-like material including a body portion having a substantially planar mounting surface, and a generally wedge-shaped sealing portion projecting from said body portion, said sealing portion converging with said mounting surface at one edge of said strip and including at least one longitudinal rib defined by a pair of inclined, intersecting surfaces diverging toward said mounting surface, said rib projecting away from said mounting surface a distance less than one third the radii of the small radius curves in the receptacle opening, whereby the mounting surface adjacent said rib engages the small radius curves to provide an undistorted line seal throughout said small radius curves of said opening.

2. The gasket in accordance with claim 1 including further, a bumper rib at the rear of said sealing portion and projecting from said base farther than said longitudinal ribs, said bumper rib having a rearwardly inclined, generally arcuate front surface and a substantially planar rear surface, said body portion rearwardly of said sealing portion defining with said planar rear surface, means for receiving a generally L-shaped mounting strip.

3. The sealing device recited in claim 2 in which said planar rear surface is inclined rearwardly with respect to a plane normal to said base.

4. In combination a closure member and a polygonal receptacle having an opening with small radius curves between the straight portions thereof, a gasket mounted in said opening and conforming to said curves providing a fluid seal between said closure member and said opening, said gasket comprising:

an elongated strip of rubber-like material including a body portion having a substantially planar base providing a seal in fluid tight relationship against the peripheral edges of the opening throughout the small radius curves in the corners thereof, and a generally wedge-shaped sealing portion projecting from said body portion and converging toward the forward edge of said base, said sealing portion having a plurality of longitudinal ribs of saw-tooth cross-sectional configuration engaged by contacting surfaces on said closure member and a bulbous bumper rim extending longitudinally at the rearward edge of said sealing portion, at least the two forwardmost of said ribs of saw-tooth cross section projecting from said base a distance less than one third of the radii of the small radius curves whereby the mounting surface adjacent said ribs engages the small radius curves to provide an undistorted line seal throughout the small radius curve of said opening.

References Cited by the Examiner
UNITED STATES PATENTS

| | | | |
|---|---|---|---|
| 1,689,194 | 10/1928 | Clark. | |
| 1,888,358 | 11/1932 | Palenske. | |
| 1,889,439 | 11/1932 | Greenwald. | |
| 2,099,597 | 11/1937 | Carr. | |
| 2,122,608 | 7/1938 | Harlow. | |
| 2,734,239 | 2/1956 | Lombardi. | |
| 2,778,868 | 1/1957 | Stinger | 220—46 |
| 2,828,043 | 3/1958 | Hosford | 220—46 |
| 2,910,312 | 10/1959 | Palmer | 220—46 |
| 3,058,527 | 10/1962 | Dennis | 220—46 |
| 3,065,517 | 11/1962 | Dower. | |
| 3,110,065 | 11/1963 | Dennis. | |

THERON E. CONDON, *Primary Examiner.*

EARLE J. DRUMMOND, *Examiner.*